United States Patent [19]

Allegro

[11] 4,242,766
[45] Jan. 6, 1981

[54] HEAT TRANSFER BED ASSEMBLIES

[76] Inventor: Joseph Allegro, 731 NE. 69th St., Boca Raton, Fla. 33431

[21] Appl. No.: 47,355

[22] Filed: Jun. 11, 1979

[51] Int. Cl.³ .................. A47C 27/08; A47C 21/08
[52] U.S. Cl. ............................. 5/422; 5/284; 5/451
[58] Field of Search .................. 165/46; 237/1 A; 126/426, 428, 430, 205, 210; 5/284, 400, 421, 422, 451, 455

[56] References Cited

U.S. PATENT DOCUMENTS

| | | | |
|---|---|---|---|
| 1,121,277 | 12/1914 | Mitchell | 5/421 |
| 2,579,964 | 12/1951 | Reynolds | 5/421 |
| 3,918,110 | 11/1975 | Cantillo et al. | 5/452 |
| 4,107,799 | 8/1978 | Lambert | 5/451 |
| 4,114,215 | 9/1978 | Sareto | 5/422 |
| 4,143,814 | 3/1979 | Hill, Jr. | 126/427 |

*Primary Examiner*—Casmir A. Nunberg
*Attorney, Agent, or Firm*—Laurence R. Brown

[57] ABSTRACT

This invention provides a bed assembly having a thermally absorbent mattress such as a water-bed in thermal conductive relationship with a thermal-panel mattress bin arrangement receiving the mattress. Thermal energy transfer bath for cooling and heating is then attained by circulating a fluid of proper temperature through the thermal panel. The fluid temperature is established with environmental solar and ground heat to reduce needs for fossil fuel energy. Thus, an efficient temperature controlled bed is provided which permits nighttime comfort without control of the temperature throughout a house.

8 Claims, 4 Drawing Figures

HEAT TRANSFER BED ASSEMBLIES

TECHNICAL FIELD

This invention relates to heat transfer techniques, and more specifically it relates to controlling the temperature of a bed by means of circulation of fluids in a bed assembly so that the mattress temperature may be controlled.

DISCLOSURE OF THE INVENTION

This invention provides for thermal control of mattress temperature by means of a heat transfer panel provided in a bed assembly in thermal contact with the mattress to control its temperature by means of a circulating fluid passed through the heat transfer panel. The mattress and heat transfer panel are conditioned to efficiently exchange heat with the circulating fluid in order to conserve energy and achieve effective temperature control. The fluid is typically water processed from a water storage tank which may be heated by a solar heater device or cooled by a heat pump to provide the desired mattress temperature. Heat energy is conserved in the circulation system by means of transfer to the mattress typically when used to the exclusion of controlling temperature of an entire house for example. Special mattress and bed features are provided cooperatively interacting in the system, such as insulation and conductive layers for directing heat energy into the mattress, thermal conductive means in the mattress such as water or metallic transfer surfaces and the heat transfer panel is preferably in the form of a bin seating the mattress properly to assure efficient heat transfer.

BACKGROUND ART

There is not an efficient thermally controlled bed assembly in the prior art that is not dependent upon fossil fuel or electrical energy controls. Some examples of the prior art devices are found in U.S. Pat. Nos. 1,121,277, 1,392,268, 3,438,069, 800,967, 882,714 and 647,374. However, these devices do not afford efficient thermal energy transfer into the bed, nor do they effectively use environmental energy sources.

Accordingly it is a general object of this invention to provide improved efficient thermally controlled bed assemblies.

THE PREFERRED EMBODIMENTS OF THE INVENTION

Figure 1:
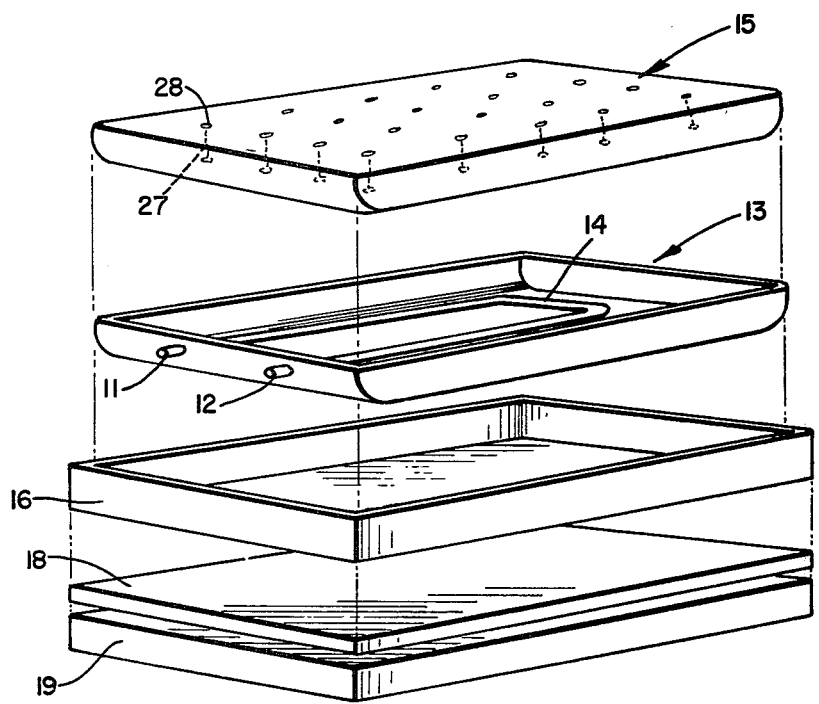
FIG. 1 is an exploded perspective view of a bed assembly as provided by the invention.

In FIG. 1, the perspective exploded view of a bed shows an uppermost mattress 15 and a lowermost insulation sheet 18, preferably of polyurethane foam, with a heat transfer panel arrangement 13 sandwiched therebetween. Bed frame members 16 and 19 provide respectively a seat for the heat transfer panel and a footing for the bed.

Figure 2:
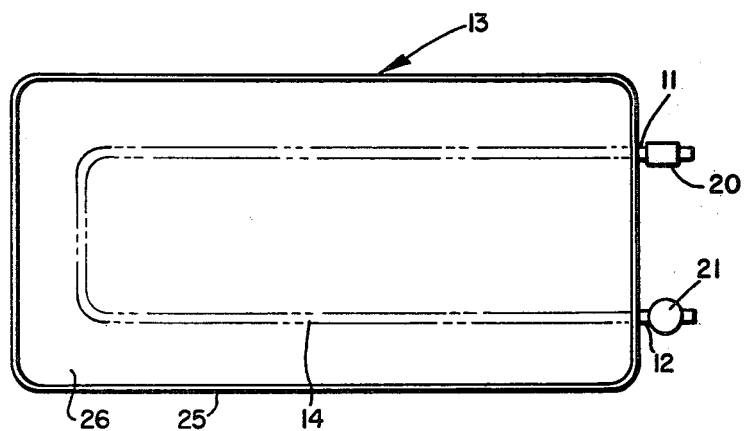
FIG. 2 is a top view of one heat transfer panel embodiment of the invention.

As seen also by reference to FIG. 2, the heat transfer panel 13 has sloping side panels 25 forming a bin for receiving and seating mattress 15 in thermal contact with the thermal transfer elements in the heat transfer panel 13. Alternate structure also can be used as the transfer element, such as U.S. Ser. No. 861,450 filed Dec. 16, 1977, now U.S. Pat. No. 4,158,357 granted June 19, 1979, whereby pipes are replaced by pathway moulded in polyester resin. Thus, for example the piping 14 represents a heat transfer element that operates from circulating fluid controlled by pump 21 and thermostatically controlled flow valve 20 connected thereto at fittings 11 and 12 extending outside a liquid proof liner 26 surrounding the piping to prevent possible condensation or leakage from wetting the mattress 15. The liner is selected of a thermally conductive layer of thin reinforced plastic or preferably to more efficiently transfer and distribute heat from the piping 14 is a metallic layer of copper, galvanized iron sheet or the like that produces an entire panel 26 of heat exchange surface in contact with the mattress 15.

The mattress 15 is preferably water filled to constitute a water bed arrangement which efficiently transmits and retains heat from the panel 26. However a standard mattress may be used, but if the heat insulation properties tend to prevent transmission of heat from the panel 26, then metallic heat conductor elements 27 such as springs are preferably attached to heat transfer interfaced surfaces 28 that contact the heat transfer panel 26 for good heat conduction into the mattress body. Thus when the mattress contour fits into the bin formed by the heat transfer panel vertically extending side walls 25, good thermal conductivity occurs on the upper side and the foam insulation layer 18 prevents significant losses downwardly from the heat transfer panel 13.

Figure 3:
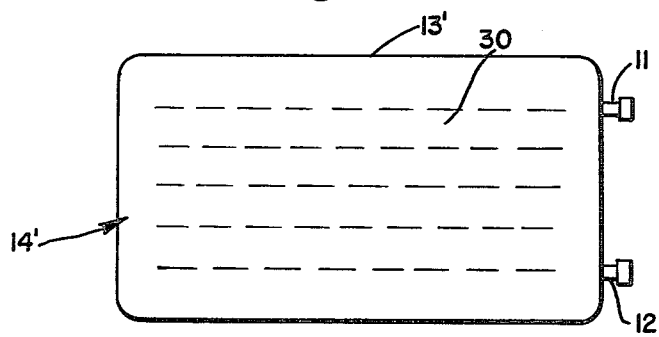
FIG. 3 is a top view of a further heat transfer panel embodiment of the invention.

As shown in FIG. 3, the heat transfer panel may be made more inexpensively by fastening upper and lower plastic fabric or paneled layers together at seams 30 to form thereinside a meandering fluid flow passageway extending between fittings 11 and 12. Preferably the bottom layer has good thermal insulation qualities and the upper layer good thermal conductivity qualities. One further advantage of this embodiment is the greater available surface area of fluid that is an excellent thermal storage medium which can transfer heat from the panel 13'.

Figure 4:
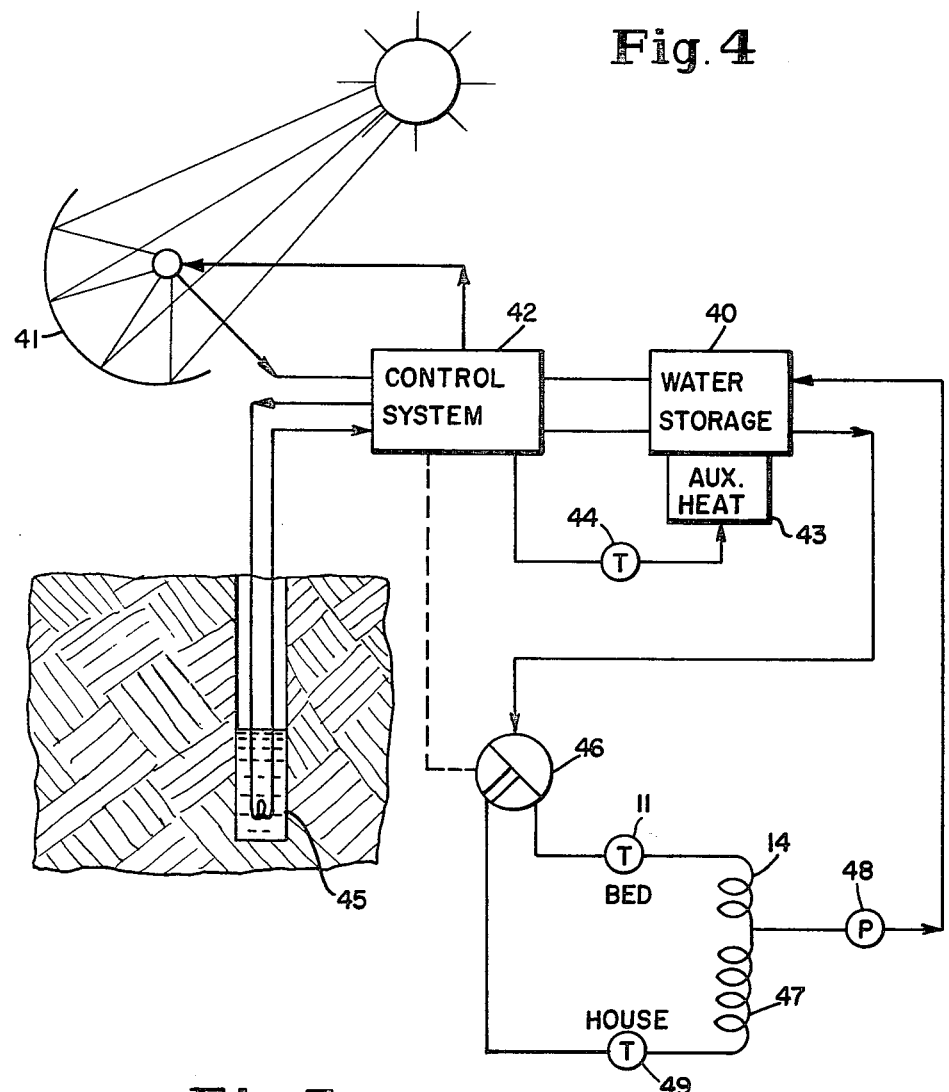
FIG. 4 is a system schematic diagram of a fluid circulation system passing fluid through the bed heat transfer panel.

The bed assembly is used in a system such as shown in FIG. 4 where preferably the water in storage tank 40, which is to be circulated through the bed heat transfer piping 4 is heated or cooled by environmental energy. Thus the solar collector 41 provides heated water for wintertime use as selected through a typical thermostat or other control system 42. Also if necessary when not enough solar energy is present, an auxiliary heater 43 may be activated under control of thermostat 44 to keep the water temperature proper.

Conversely, for summertime use in cooling, the heat pump system typified by well 45 serves to cool water in storage tank 40.

Efficiency of use of heat energy is important to conserve fossil fuel and for economy of operation. Thus, the use of environmental heat energy is preferable. Also for conservation of energy the water circulation system supplying the bed heat transfer passageways 14 has a transfer valve 46, which permits the heat transfer to be effective only in the bed to the exclusion of auxiliary heat sources typified by the house heat transfer network 47. The amount of energy for human comfort with the improved bed arrangement of this invention is very small and thus during night hours the heat energy drain can be considerably reduced by selective operation of only the bed heating circuit by means of transfer valve 46.

Also the control of the flow of fluid circulated by pump 48 respectively through the bed passageways 14 and house circuit 47 is effected by respective thermostatically controlled valves 11 and 49 which pass only enough fluid to attain the required temperature as selected by thermostat setting.

Accordingly a novel and efficient heating system is afforded by this invention which permits the attainment of comfortable bed temperatures with little expenditure of energy and with maximized use of environmental heat energy.

INDUSTRIAL APPLICATION

Environmental thermal energy stored in a fluid such as water is circulated for heat transfer into a mattress of a specially constructed bed having a heat transfer panel therein. This requires use of little fossil fuel energy and efficiently isolates the need for thermal energy during nighttime hours to the bed frame as contrasted with heating several rooms of a house for example. Thus, specially built thermal transfer bed assemblies are provided by this invention.

I claim:

1. A heat transfer bed assembly comprising in combination a lowermost thermal insulating panel, an uppermost mattress panel and an intermediate heat transfer panel sandwiched between the insulating panel and the heat transfer panel containing inlet and outlet fittings connected to an internal passageway for circulation of fluid through the heat transfer panel, and a fluid confining thermally conductive liner about the upper side of the heat transfer panel in thermal contact with the mattress panel.

2. An assembly as defined in claim 1 wherein said mattress panel comprises a fluid filled mattress.

3. An assembly as defined in claim 1 wherein said mattress panel has metallic heat conduction elements extending through its thickness to contact thermally said fluid confining conductive liner.

4. An assembly as defined in claim 1 wherein said passageway is connected in a fluid circulation system passing fluid through said passageway, the combination including sources of cold and warm fluid and thermostatically controlled means controlling the fluid flow temperature through said heat transfer panel by selectively circulating fluid from the two said sources.

5. An assembly as defined in claim 4 including transfer means selectively directing fluid alternatively between said passageway and further thermal utilization means.

6. An assembly as defined in claim 1 wherein said heat transfer panel comprises two reinforced plastic sheet panels connected together by seams to produce a meandering pattern forming said passageway for circulation of fluid.

7. An assembly as defined in claim 1 wherein said heat transfer panel has a metallic upper surface in contact with the mattress panel to thermally transfer heat uniformly thereto.

8. An assembly as defined in claim 7 wherein said heat transfer panel has upwardly extending integral side walls forming a bin to receive therein said mattress.

* * * * *